8167X
W. B. Dobson.
Oliver.
Patented Apr. 25, 1834.
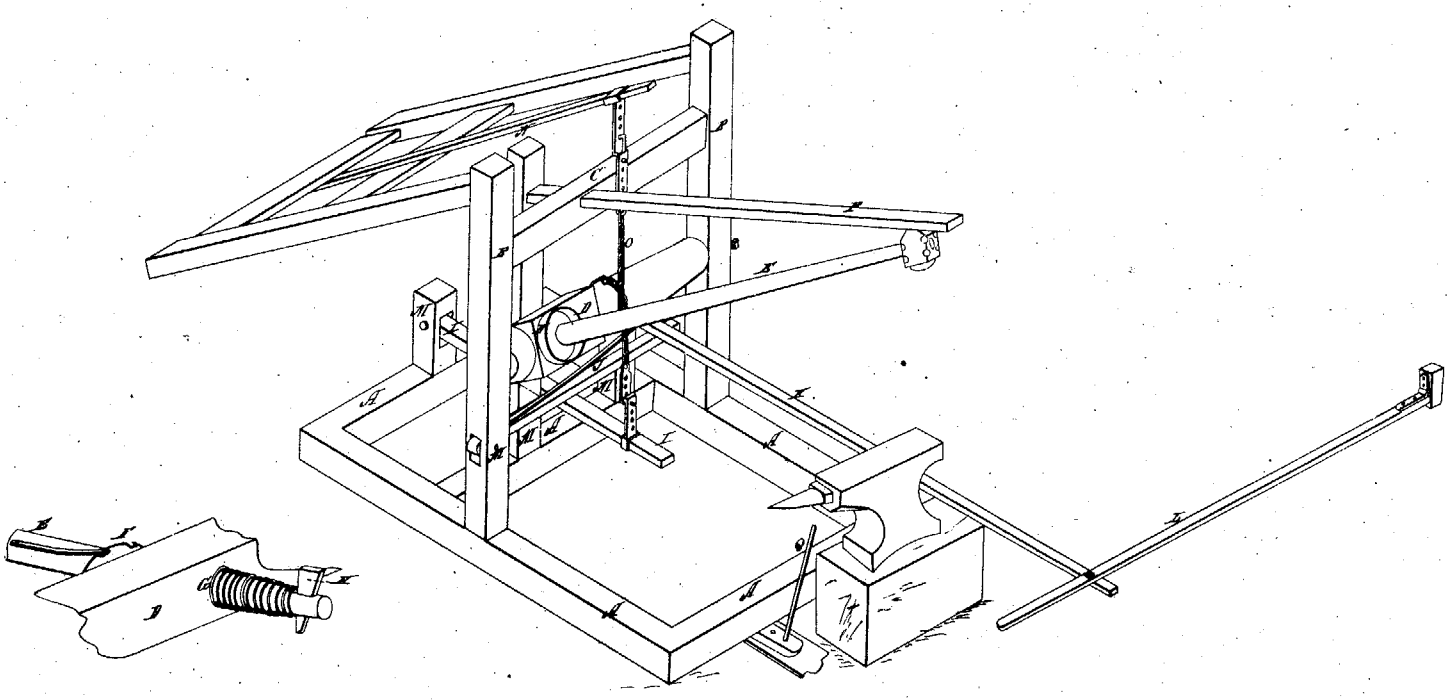
THE GRAPHIC CO. PHOTO-LITH. 39 & 41 PARK PLACE, N.Y.

William B Dobson of Surry County. North Carolina

Letters. Patent.

The Schedule referred to in these Letters Patent and making part of the same containing a description in the words of the said William B Dobson himself of his Improvement called the "Black Smiths assistant Striker"

To all whom these presents shall come. Be it known that I William B Dobson of the United States in the County of Surry and State of North Carolina; have invented a new and useful improvement in the "Blacksmiths assistant striker", and that the following is a full and exact description of the construction and operation of the said machine as invented or improved by me, to wit; The foundation of this machine consists of five sills five by four inches square, namely, two side sills six feet long. two end pieces and one cross piece four feet long, formed into a frame by means of the end sills and cross sill (which is 18 inches from the back end of the frame) being let into the side sills with tenons. On each of the two side sills stand two upright supporters four inches square by means of tongues and mortises into the middle of the side sills. which upright supporters are five feet high. One foot from the top of these upright supporters extending from one to the other is a cross beam three by five inches square to make steadfast the upright supporters at and for purposes hereafter mentioned. Three feet from the bottom of the frame extending from one of these upright supporters to the other and let into each of said upright supporters with iron gudgeons three quarters of an inch in diameter driven into the ends thereof is the hammer axle. through which passes the far end of the helve of the hammer. and this hammer axle should be about nine inches square and this square left one foot long at the part thro which passes the helve and the ends turned down to about five inches in diameter. The helve of the hammer is about five feet long round or square as fancy may direct extending thro the axle nine inches made thicker where it joins the axle and gradually tapering towards the hammer. The hole in the hammer axle through which passes the helve of the hammer is widest in front. The end of the helve which passes thro the axle should be round and tapering. from a tapering shoulder to the end precisely after the manner of the axle of a waggon. this tapering part of the helve should be nineteen or twenty inches long. should correctly fit the hole in the axle but not so tight as to prevent its turning round in the hole when necessary. The helve of the hammer tho fitted thro the axle only for the purpose of shifting (by turning it)

8167X the face of the hammer as to enable the workman to hammer his iron thinner at one side than
the other, for instance to make a horse shoe is made firm in any one position in manner follow
ing to wit. on the front part of the axle thro which passes the end of the helve is firmly spiked
with iron spikes. a round piece of timber one inch thick which may be made by sawing off
the end of a round piece of timber. a wheel of one inch thick or long and nine inches in
diameter having a hole suiting the hole in the axle & with like tapering. And on this wheel of
timber spiked to the front of the axle is drawn an iron band. two inches broad and of suit
able thickness which will throw the band one inch over the edge of the timber it surrounds, and
on the front edge of the band is cut notches up and down and thro the helve of the tapering
shoulder thereof runs a cross round bolt. of iron half inch thick and ten inches long
made firm & fast in the helve & to fit the notches in the band of iron above and below.
as it may be turned round one way or the other. and the rod or bolt of iron is confined
in whatever notches of the iron band it may be put. by means of a steel wire spring wrap-
ped round the tapering end of the helve. which extends nine inches through the axle. which
spring is wrapped in worm manner round the end of the helve from the axle nearly
to the end near the end of the helve. is an oblong square mortise half way over which ex-
tends in its winding the steel wire spring & a tapering wedge is then driven into the
mortise which puts the spring in such constant strain as to confine (by drawing back
the helve up hard to its shoulder) the said rod into the notches. The helve of the ham-
mer should pass thro the left end of the axle, about ten inches from the end as it fronts
the workman. The hammer should weigh about ten pounds, but may be varied in size
to suit the fancy of the workman. On the centre of the back sill stands fitted into the
sill a firm upright post four inches square about one foot high. into which is let a
square treadle extending towards the anvil about three feet six inches. three by two inch-
es square. Thro the left hand middle upright supporter below the axle is mortised
an oblong square mortise & in this mortise is fitted another treadle extending across the
frame from one supporter nearly to the other passing just above the first treadle:
near the end of this treadle where it works in the supporter and on the top thereof is screw-
ed a steel or wooden spring so as elevate the other end which when it meets the upright
supporter on the other side is considerably above the second treadle. on the middle cross
sill near the upright end thereof as it fronts the workman, stands another upright steed-
fast post four inches square and about eighteen inches high, into which is fixed a
third treadle extending front passing the right hand side of the anvil block some eight feet long and resting on the end of the second mentioned treadle. This third treadle should be three inches at one end and tapering out towards the workman to about two inches square. This third treadle should be so fixed into its post as to elevate its end next the workman. On the top of each of the two middle upright supporters is framed with tongue groove and pin, a piece of timber four inches square, extending back three feet ten inches, inclining downwards: The ends of these pieces last mentioned are united with tongues and mortices by two cross pieces of timber four by one inch broad. one of these pieces at the end and the other one foot from it nearer the two supporters. On the lower side of this first cross piece is screwed a steel or suitable wood en spring about four feet long extending gradually upwards over the axle and resting on the nearer cross piece. At the middle of the axle are two staples or hooks of iron one driven into the upper side of the axle and the other directly below. The lower staple in the axle is geared up to the spring above by means of a thin plate or bar of iron about nine inches long with about five holes in it equidistant from each other & chains of suitable length at each end. the upper chain having a hook to its lower end by means of which and the holes in the iron plate, the hammer may be lowered or elevated towards the upper spring. The staple in the upper part of the axle is in like manner geared to the first or lowest treadle. On the middle sill about ten inches from the left end thereof as it fronts the workman stands an upright post four inches square and near four feet high. thro which is mortised a hole and in it is fitted the end of a rabbit which passes front thro a mortise in the cross piece uniting the supporters at top over the hammer. which the hammer when carried up by the upper spring strikes is stopped, or rather forced back. In the supporter on the right hand side as it fronts the anvil. and just above where the first described spring on the second treadle touches it is bored a hole in which when the workman would strike fast. should be driven an iron bar against which this spring works and assists greatly in rapid striking. There is a fourth treadle fixed transversely at the end of the third treadle. The end of which from the anvil is fastened to a post or stake in the floor and the other which extends to the right foot of the workman passing the end of the third treadle about one foot. is joined to the end of the third treadle by means of an iron rod fast in the foot treadle and extending up through the end of the third treadle and secured by a screw tap above. This treadle brought down by the foot brings down the hammer to the anvil. The

8167X the face of the hammer as to enable the workman to hammer his iron thinner at one side than
the other, for instance to make a horse shoe is made firm in any one position in manner follow
ing to wit. on the front part of the axle, thro which passes the end of the helve is firmly spiked
with iron spikes, a round piece of timber one inch thick which may be made by sawing off
the end of a round piece of timber. a wheel of one inch thick or long and nine inches in
diameter having a hole suiting the hole in the axle & with like tapering. And in this wheel of
timber spiked to the front of the axle is drawn an iron band. two inches broad and of suit
able thickness which will throw the band one inch over the edge of the timber it surrounds, and
on the front edge of the band is cut notches up and down and thro the helve of the tapering
shoulder thereof runs a cross round bolt. of iron half inch thick and ten inches long
made firm & fast in the helve & to fit the notches in the band of iron above and below.
as it may be turned round one way or the other. and the rod or bolt of iron is confined
in whatever notches of the iron band it may be put, by means of a steel wire spring wrap
ped round the tapering end of the helve, which extends nine inches through the axle. which
spring is wrapped in worm manner round the end of the helve from the axle nearly
to the end near the end of the helve. is an oblong square mortice half way over which ex-
tends in its winding the steel wire spring & a tapering wedge is then driven into this
mortice which puts the spring in such constant strain as to confine (by drawing back
the helve up hard to its shoulder) the said rod into the notches. The helve of the ham-
mer should pass thro the left end of the axle, about ten inches from the end as it fronts
the workman. The hammer should weigh about ten pounds, but may be varied in size.
to suit the fancy of the workman. On the centre of the back sill stands fitted into the
sill a firm upright post. four inches square about one foot high. into which is let a
square treadle extending towards the anvil about three feet six inches. three by two inch-
es square. Thro the left hand middle upright supporter below the axle is mortised
an oblong square mortice & in this mortice is fitted another treadle extending across the
frame from one supporter nearly to the other passing just above the first treadle.
near the end of this treadle where it works in the supporter and on the top thereof is erec-
ted a steel or wooden spring so as elevate the other end which where it meets the upright
supporter on the other side is considerably above the second treadle. on the middle cross
sill near the upright end thereof as it fronts the workman, stands another upright steel
fast post four inches square, and about eighteen inches high, into which is fixed a
third treadle extending front passing the right hand side of the anvil block some eight feet long and resting on the end of the second mentioned treadle. This third treadle.
should be three inches at one end and tapering out towards the workman to about two
inches square. This third treadle should be so fixed into its post as to elevate its
end near the workman. On the top of each of the two middle upright supporters.
is framed with tongue groove and pin, a piece of timber four inches square, extending
back three feet ten inches. inclining downwards. The ends of these pieces last men-
tioned are united with tongues and mortices by two cross pieces of timber four by one inch
broad. one of these pieces at the end and the other one foot from it nearer the two
supporters. On the lower side of this first cross piece is screwed a steel or suitable wood
en spring about four feet long extending gradually upwards over the axle and resting
on the nearer cross piece. At the middle of the axle are two staples or hooks of iron
one driven into the upper side of the axle and the other directly below. The lower
staple in the axle is geared up to the spring above by means of a thin plate or bar of
iron about nine inches long with about five holes in it equidistant from each other &
chains of suitable length at each end. The upper chain having a hook to its lower
end by means of which and the holes in the iron plate, the hammer may be lowered
or elevated towards the upper spring. The staple in the upper part of the axle is
in like manner geared to the first or lowest treadle. On the middle sill about
ten inches from the left end thereof as it fronts the workman. stands an upright post
four inches square and near four feet high. thro which is mortised a hole and in it
is fitted the end of a rabbit which passes front thro a mortise in the cross piece uni-
ting the supporters, at top over the hammer. which the hammer when carried up
by the upper spring strikes is stopped, or rather forced back. In the supporter
on the right hand side as it fronts the anvil. and just above where the first descri-
bed spring on the second treadle touches it is bored a hole in which when the work
man would strike fast. should be driven an iron bar against which this spring
works and assists greatly in rapid striking. There is a fourth treadle fixed trans-
versely at the end of the third treadle. The end of which from the anvil is fasten
ed to a post or stake in the floor and the other which extends to the right foot of the
workman passing the end of the third treadle about one foot. is joined to the end
of the third treadle by means of an iron rod fast in the foot treadle and extending
up through the end of the third treadle and secured by a screw tap [illegible]
This treadle brought down by the foot brings down the hammer to the anvil. The front end of the machine being laid on a flat thin piece of timber with holes bored in the side near the anvil and a short piece of timber being mortised into the front sill extending over these holes having also a hole in it over the lower holes. the front part of the striker may be easily moved from side to side with a small iron or wooden lever. This machine may be made of greater or less dimensions by observing the proportions above described. of this machine. the hammer its helve the axle the simple principle of making it with a lever and the lower part of the frame are old. the balance thereof. the improvement. that the above described machine [illegible] all and every part thereof is new except as above. In witness that the above is a true specification I have hereunto set my hand April 1st AD 1824

Witnesses
Winston Somers
Thos Jefferson Ward

Wm. B. Dobson

Drawing